United States Patent
Holtmanns et al.

(10) Patent No.: US 9,107,192 B2
(45) Date of Patent: Aug. 11, 2015

(54) COMMUNICATION APPARATUS AND ASSOCIATED METHODS

(75) Inventors: Silke Holtmanns, Klaukkala (FI); Zhongliang Hu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 108 days.

(21) Appl. No.: 13/993,439

(22) PCT Filed: Dec. 14, 2010

(86) PCT No.: PCT/IB2010/003247
§ 371 (c)(1),
(2), (4) Date: Jul. 3, 2013

(87) PCT Pub. No.: WO2012/080763
PCT Pub. Date: Jun. 21, 2012

(65) Prior Publication Data
US 2013/0337743 A1    Dec. 19, 2013

(51) Int. Cl.
H04B 7/24 (2006.01)
H04W 76/02 (2009.01)
H04W 12/06 (2009.01)
H04W 8/20 (2009.01)
H04W 88/18 (2009.01)
H04L 29/12 (2006.01)

(52) U.S. Cl.
CPC ............. *H04W 76/02* (2013.01); *H04W 12/06* (2013.01); *H04L 61/2069* (2013.01); *H04W 8/20* (2013.01); *H04W 88/182* (2013.01)

(58) Field of Classification Search
CPC .................................................. H04W 12/06
USPC .................. 455/39, 410, 432.3, 550.1, 556.1, 455/556.2, 558
See application file for complete search history.

(56) References Cited

U.S. PATENT DOCUMENTS 7,603,107 B2    10/2009 Ratert et al.
8,615,272 B2 *  12/2013 Chatrath ................... 455/556.1
2005/0215243 A1  9/2005 Black et al.
(Continued)

FOREIGN PATENT DOCUMENTS

EP          1887824 A1    2/2008
WO      2012/052806 A1    4/2012

OTHER PUBLICATIONS

International Search Report and Written Opinion received for corresponding Patent Cooperation Treaty Application No. PCT/IB2010/003247, dated Oct. 10, 2011, 13 pages.
(Continued)

*Primary Examiner* — Tuan H Nguyen
(74) *Attorney, Agent, or Firm* — Locke Lord LLP

(57) ABSTRACT

A first apparatus having a first identity associated therewith the first apparatus, the first apparatus comprising: at least one processor; and at least one memory including computer program code, the at least one memory and the computer program code configured to, with the at least one processor, cause the first apparatus to perform at least the following: enable transmission of a proxy initiation command to a second apparatus, wherein the proxy initiation command is configured to enable the second apparatus to initiate a first-identity-second-apparatus connection, the first-identity-second-apparatus connection enabling the second apparatus to transmit data denoted as being from the first identity and/or receive data denoted as being to the first identity via the data network.

18 Claims, 6 Drawing Sheets

(56) References Cited

U.S. PATENT DOCUMENTS

| | | |
|---|---|---|
| 2005/0266883 A1 | 12/2005 | Chatrath |
| 2006/0116105 A1 | 6/2006 | Frankel et al. |
| 2010/0182970 A1 | 7/2010 | Cherian et al. |
| 2011/0239011 A1 | 9/2011 | Waris et al. |
| 2012/0052861 A1 | 3/2012 | Holtmanns |

OTHER PUBLICATIONS

Lennox et al., "Call Processing Language Framework and Requirements", RFC 2824, Network Working Group, May 2000, pp. 1-25.

* cited by examiner

COMMUNICATION APPARATUS AND ASSOCIATED METHODS

RELATED APPLICATION

This application was originally filed as Patent Cooperation Treaty Application No. PCT/IB2010/003247 filed Dec. 14, 2010.

TECHNICAL FIELD

The present disclosure relates to the field of communication devices, associated methods, computer programs and apparatus. Certain disclosed aspects/example embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/example embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

A communications network (e.g. cellular, satellite, landline communications or combinations thereof, including telephony and non-telephony communications) can be configured, for example, to support multiple communication devices (e.g. mobile phones). Each of these communication devices, for example, can be associated with an identity which is used by the network to direct calls and messages (or other data associated with the identity) to/from the corresponding communication device.

The listing or discussion of a prior-published document or any background in this specification should not necessarily be taken as an acknowledgement that the document or background is part of the state of the art or is common general knowledge. One or more aspects/example embodiments of the present disclosure may or may not address one or more of the background issues.

SUMMARY

In a first aspect, there is provided a first apparatus having a first identity associated therewith the first apparatus, the first apparatus comprising:
  at least one processor; and
  at least one memory including computer program code,
  the at least one memory and the computer program code configured to, with the at least one processor, cause the first apparatus to perform at least the following:
  enable transmission of a proxy initiation command to a second apparatus, wherein the proxy initiation command is configured to enable the second apparatus to initiate a first-identity-second-apparatus connection, the first-identity-second-apparatus connection enabling the second apparatus to transmit data denoted as being from the first identity and/or receive data denoted as being to the first identity via the data network.

The identity may provide for addressed communication (e.g. unicast, broadcast and/or multicast communication). Addressed communications may be considered to be communications directed to or originating from an identity.

In a second aspect there is provided a second apparatus comprising:
  at least one processor; and
  at least one memory including computer program code,
  the at least one memory and the computer program code configured to, with the at least one processor, cause the apparatus to perform at least the following:
  receive a proxy initiation command associated with a first apparatus having a first identity;
  enable the second apparatus to initiate a first-identity-second-apparatus connection based on the received proxy initiation command, the first-identity-second-apparatus connection enabling the second apparatus to transmit data denoted as being from the first identity and/or receive data denoted as being to the first identity via the data network.

Data denoted as being from an identity (e.g. a first identity) may comprise and/or be associated with denotation (e.g. addressing) information indicating that the data originates from an apparatus having that identity (e.g. the first identity). Data denoted as being to an identity may comprise and/or be associated with denotation information indicating the intended recipient of the data. The denotation information may be available only to the network and not the recipient apparatus (e.g. calls where the originating identity (e.g. telephone number) is withheld from the recipient of the call).

The first apparatus may be configured to:
  enable the first apparatus to initiate a first-identity-first-apparatus connection to a data network, the first-identity-first-apparatus connection enabling the first apparatus to transmit data denoted as being from the first identity and/or receive data denoted as being to the first identity via the data network.

It will be appreciated that the first proxy command may enable the second apparatus to masquerade on the network using the first identity or be considered to move the identity from one apparatus to another apparatus. It will be appreciated that a proxy command may allow the transfer of a single identity, or a plurality of identities (e.g. a group transfer of a set of multiple identities associated with a first apparatus to a second apparatus). Where the first apparatus is associated with multiple identities the first apparatus and/or a third party may determine which of the multiple identities are transferable (e.g. a company may not permit the transferring of 'their' subscription). It will be appreciated that several identities may be transferred in a corresponding manner to the transfer of a single identity.

The data, associated with the first, second or any other identity, may comprise one or more of phone call data, fax data, text message data, email data, MMS message data, SMS message data, Twitter post data, email attachment data, alarm data, pager alert data, pager message data, image data, text data, video data and audio data. Transmission and/or reception of the data may be by streaming methods (e.g. a phone call), by non-streaming methods, by batches, and/or by monolithic transfer (e.g. a short text message).

The first and/or second apparatus and/or network may support datagram transfer, Peer-to-peer (P2P) protocols, Reliable protocols, Transmission Control Protocol (TCP), Unicast protocols and/or Multicast protocols.

The first, second or any other identity may be, for example, a unique number or character string (e.g. telephone number, or email address), a unique identifier (UID), an Organizationally Unique Identifier (OUI), a Media Access Control address (MAC address), an IP address, an email address, a user name, a globally unique identifier (GUID) or a Universally Unique Identifier (UUID). The identity may be allocated by the network (e.g. by a network server) or chosen by a user and registered on the network (e.g. on a network server).

The data network may allow communication between two or more devices/apparatus. The data network may comprise a wireless network. For example, the data network may comprise one or more of a cellular network, a mobile phone network, a satellite network, a radio network, a Bluetooth network, a wireless local area network or an infrared network. The data network may comprise a wired network. For example, the data network may comprise one or more of the internet, a wired local area network or a landline phone network. A wired network may, for example, be based on electrical wires or fibre optic cable. A network may be a combination of wired and wireless networks. The network may be governed by a network server. The data network may be a telephony and/or non-telephony communications network.

A proxy initiation command and a proxy termination command may be transmitted using the same command channel (e.g. the proxy initiation command and the proxy termination command may both be sent via a Bluetooth™ network channel) or different command channels (e.g. the proxy initiation command may be sent via Bluetooth™ connection and the proxy termination command sent via an SMS message on the data network). It will be appreciated that there may be a plurality of available command channels for sending proxy initiation or other commands. It will be appreciated that, where a plurality of command channels are available, the first device may be configured to elect which command channel to use (e.g. the first device may be configured to use a local network in preference to the data network) or request input from the user and base the election on the user input.

The command channel may be a secure channel (e.g. secured by encryption). The command channel may be established for the purposes of transmitting proxy initiation and/or proxy termination command. The command channel may be a previously established channel.

The respective first/second apparatus may be configured to transmit/receive the proxy initiation command via a command channel, the command channel being independent from the data network.

The proxy initiation command may be transmitted, for example, via the data network, an SMS message, an MMS message, an email, a Bluetooth™ connection, a radio frequency connection, a wired connection, an ultrasound connection, an infrared connection, a visible light connection, the internet, a USB connection, a FireWire connection, a storage device or a memory stick.

The proxy initiation command may comprise identity data representing the first identity, (e.g. in the form of a software subscriber identity module (SIM)). The proxy initiation command may comprise activation command data (e.g. to enable the second apparatus to use the identity data representing the first identity to initiate a connection). The proxy initiation command may comprise capability data. Capability data may describe the capability of the first-identity-second-apparatus connection. Capability data may restrict how the first identity may be used by the second apparatus (e.g. it may give a time limit on how long the first-identity-second-apparatus may be active, and/or restrict the services available).

The proxy initiation command may not comprise capability data (e.g. where there are no restrictions on the first-identity-second-apparatus connection). The proxy initiation command may not comprise identity data representing the first identity (e.g. where identity data representing the first identity is previously stored on the second device). The proxy initiation command may comprise denotation data denoting the intended recipient (e.g. where the proxy initiation command is transmitted to an identity via the data network).

At least one of the connections may be enabled using a hardware SIM and/or a software SIM. The first/second apparatus may store the SIM data on a combination of one or more of a chip, a memory chip, a secure chip, a smart card, flash memory and conventional memory.

The first apparatus may be configured to:
  determine at least one parameter associated with the first apparatus and/or second apparatus; and
  on the basis of the determination, perform at least one of:
    initiate transmission of the proxy initiation command from the first apparatus to the second apparatus;
    initiate transmission of a proxy termination command from the first apparatus to the second apparatus, the proxy termination command being configured to enable the second apparatus to terminate the first-identity-second-apparatus connection;
    disable the first-identity-first-apparatus connection.

The proxy termination command may enable the second apparatus to delete data (e.g. data stored locally on the second apparatus) representing the first identity.

The at least one parameter may comprise one or more of:
  geographical location of the first apparatus (e.g. when the device moves inside or outside a given area it initiates the transmission of the proxy initiation command);
  availability of the second apparatus (e.g. the first apparatus detects whether the second apparatus is available);
  energy available to the first apparatus (e.g. battery life);
  power consumption of the first apparatus;
  rate of change of energy available to the first apparatus;
  power available to the first apparatus;
  rate of change of power available to the first apparatus;
  quality of first-identity-first-apparatus connection; and
  rate of change of quality of the first-identity-first-apparatus connection.

The first-identity-first-apparatus connection may be enabled by registering, on the network (e.g. on a network server), an association of the first identity with the first apparatus. The second-identity-second-apparatus connection may be enabled by registering, on the network (e.g. on a network server), an association of the second identity with the second apparatus. The first-identity-second-apparatus connection may be enabled by registering, on the network (e.g. on a network server), an association of the first identity with the second apparatus.

The first apparatus and/or second apparatus may be configured to: enable the said connections to be registered on a network hierarchy, the network being configured to determine which connection and/or connections to use for transmitting data on the basis of each said connection's rank in the network hierarchy. The hierarchy may, for example, be a Home Location Register (HLR), or Home Subscriber Server (HSS), or User Profile Server Function (UPSF).

The first apparatus may be configured to: disable the first-identity-first-apparatus connection when the proxy initiation command is transmitted. The second apparatus may be configured to: activate a previously stored first identity based on the received proxy initiation command.

The proxy initiation command may comprise an activation command and not first identity data, the first identity data representing the first identity. The activation command may be associated with and/or identify the first identity. The first data may be previously stored on the second apparatus. The first identity data may be a copy of first identity data stored on the first apparatus. The first identity may have previously sent encryption information (e.g. a cryptographic key) to ensure secure transfer of the proxy command/identity data.

The proxy initiation command may comprise first identity data, the first identity data representing the first identity associated with the first apparatus. For example, it may contain the MAC address associated with the first identity. The proxy initiation command may not comprise first identity data. The second apparatus may have access to the identity data representing the first identity (e.g. by having it stored locally on the second apparatus, or enabling the second apparatus to retrieve the data from another source).

The first apparatus may retain identity data representing the first identity after the proxy command has been transmitted.

The identity data representing the first identity may be in the form of a hardware or software subscriber identity module (SIM). A SIM may contain one or more of a unique serial number, an International Mobile Subscriber Identity (IMSI), security authentication and ciphering information, temporary information related to the local network, a list of the services the user has access to (e.g. capability data), a personal identification number (PIN) and a PIN Unlock key (PUK) for unlocking. The identity may be considered to identify a subscription.

The first apparatus may elect to transmit the proxy initiation command to the second phone on the basis of a predetermined relationship. The predetermined relationship may be based on one or more of the following:

the proximity of the second apparatus to the first apparatus (e.g. Instant Community, such as Nokia Instant Community, or any near field communication link);

a server based contact list (application server provided friends list e.g. Facebook®);

a list of contacts stored on the first apparatus (e.g. Phone Book or self-created buddy list);

external provisioning (e.g. company phone provisioned acceptable list or operator only allows other subscribers of his network); and user defined apparatus (e.g. the user specifies, for example, a certain family member's mobile phone, or another phone used by the user (e.g. a work or personal phone)).

The first apparatus may be configured to:

create a set of rules describing the capability of the first-identity-second-apparatus connection; and transmit the set of rules to the network and/or the second apparatus, thereby enabling the network and/or the second apparatus to apply the set of rules when using the first-identity-second-apparatus connection.

The second apparatus may have a second identity associated therewith the second apparatus. The second apparatus may be enabled to initiate a second-identity-second-apparatus connection, the second-identity-second-apparatus connection enabling the second apparatus to transmit data denoted as being from the second identity and/or receive data denoted as being to the second identity via the data network.

The first apparatus and/or the second apparatus may be an electronic device, a portable electronic device, a module for an electronic device, a mobile phone, a computer, a laptop, a camera, a printer, a phone, a fax machine, a TV, a smart phone, a printer, a peripheral device or a personal digital assistant (PDA).

The first apparatus may generate restrictions for the first identity (a restricted identity (e.g. a restricted SIM)) in a secure environment (e.g. in secure hardware and/or software, for example, in a closed Operating System). These restrictions would be applied to the first identity when the first identity is initiated by the second device (e.g. by the network or by the second apparatus). The network operator (or network server) may restrict the transfer of the SIM-data to ensure that the restricted SIM is only transferred to a device considered to be secure enough by the operator (or network server). A restricted SIM may be a subscription which has not the full range of services available. For example a restricted SIM may have a monetary restriction (e.g. prevent charges of more than $5 per day) and/or may prevent certain numbers being called (e.g. premium rate numbers).

The restrictions on the first identity associated with the second apparatus (e.g. the first-identity-second-apparatus connection) may, for example, be service based (e.g. calls and not text messages or only the next call (e.g. where you are waiting for one urgent call)), personal preference based and/or time based (e.g. the first-identity-second-apparatus will be active only within the 9 am and 5 pm).

The first and/or second apparatus may support multiple identities. The proxy command may enable the second apparatus to support one or more of the multiple identities.

The first identity, when associated with the second apparatus, may be recognised by the network as a proxy identity (e.g. that it is a transferred and copied proxy SIM). That is, the network may distinguish between default connections (e.g. where an identity is normally associated with a particular apparatus (e.g. a first-identity-first-apparatus connection)) and proxy connections (e.g. where an identity is exceptionally associated with a particular apparatus (e.g. a first-identity-second-apparatus connection)). Further restrictions may be applied by the network (e.g. as a fail-safe so the network operator limits the damage in case the first identity has been hacked or otherwise compromised). For example, the network may require additional verification for sending and/or receiving data via the data network when using a proxy connection, compared to when using a default connection.

The network may approve the creation of a restricted identity and validate the security of the second apparatus and that the transfer may take place with the help of a provisioning server of the network operator.

The apparatus may use secure hardware for storing/copying a Restricted-SIM.

In a third aspect, there is provided a method, the method comprising:

enabling transmission of a proxy initiation command from a first apparatus having a first identity to a second apparatus, wherein the proxy initiation command is configured to enable the second apparatus to initiate a first-identity-second-apparatus connection, the first-identity-second-apparatus connection enabling the second apparatus to transmit data denoted as being from the first identity and/or receive data denoted as being to the first identity via the data network.

In a forth aspect, there is provided a method, the method comprising:

receiving a proxy initiation command associated with a first apparatus having a first identity;

enabling the second apparatus to initiate a first-identity-second-apparatus connection based on the received proxy initiation command, the first-identity-second-apparatus connection enabling the second apparatus to transmit data denoted as being from the first identity and/or receive data denoted as being to the first identity via the data network.

The International Mobile Equipment Identity (IMEI) may be transferred to the operator when the identity is transferred from the first apparatus to the second apparatus. The International Mobile Equipment Identity (IMEI) may not be transferred when the identity is transferred from the first apparatus to the second apparatus. The International Mobile Equipment Identity may be considered to be a label associated with a single apparatus. A label may comprise an IMEI and/or a cryptographic certificate.

In addition or alternatively, the first apparatus and the second apparatus may have exchanged or generated cryptographic keys beforehand to secure the identity data transfer.

In a fifth aspect there is provided a first computer program, the computer program configured to:

enable transmission of a proxy initiation command from a first apparatus having a first identity to a second apparatus, wherein the proxy initiation command is configured to enable the second apparatus to initiate a first-identity-second-apparatus connection, the first-identity-second-apparatus connection enabling the second apparatus to transmit data denoted as being from the first identity and/or receive data denoted as being to the first identity via the data network.

In a sixth aspect there is provided a second computer program, the computer program configured to:

receive a proxy initiation command associated with a first apparatus having a first identity;

enable the second apparatus to initiate a first-identity-second-apparatus connection based on the received proxy initiation command, the first-identity-second-apparatus connection enabling the second apparatus to transmit data denoted as being from the first identity and/or receive data denoted as being to the first identity via the data network.

The first/second computer program may be stored on a CD, a DVD, a memory stick or other non-transitory medium.

In a seventh aspect there is provided an apparatus, the apparatus comprising:

a means of enabling configured to enable transmission of a proxy initiation command from a first apparatus having a first identity to a second apparatus, wherein the proxy initiation command is configured to enable the second apparatus to initiate a first-identity-second-apparatus connection, the first-identity-second-apparatus connection enabling the second apparatus to transmit data denoted as being from the first identity and/or receive data denoted as being to the first identity via the data network.

In a eighth aspect there is provided an apparatus, the apparatus comprising:

a means of receiving configured to receive a proxy initiation command associated with a first apparatus having a first identity;

a means of enabling configured to enable the second apparatus to initiate a first-identity-second-apparatus connection based on the received proxy initiation command, the first-identity-second-apparatus connection enabling the second apparatus to transmit data denoted as being from the first identity and/or receive data denoted as being to the first identity via the data network.

In a ninth aspect, there is provided a server, the server configured to:

maintain a list of connections to a data network;

enable a first-identity-second-apparatus connection, the first-identity-second-apparatus connection enabling the second apparatus to transmit data denoted as being from the first identity and/or receive data denoted as being to the first identity via the data network.

The server and/or network may be configured to approve the creation of the first-identity-second-apparatus connection (e.g. a restricted SIM copied to the second apparatus). The server and/or network may be configured to validate the security of the second apparatus before the second apparatus can initiate a first-identity-second-apparatus connection. The server and/or network may be configured to enable transfer of the proxy initiation command (e.g. using a provisioning server).

Each connection may represent an association between and apparatus and identity on a network (for example, the first-identity-first-apparatus connection represents the association of the first identity and the first apparatus enabling the first apparatus to connect to the data network). The server may maintain a hierarchy of connections. The data associated with an identity may be directed to an apparatus associated with the identity based on the connection associated with the apparatus and the identity's position in the hierarchy. The configuration of the network may be enabled by suitably configuring one or more network servers.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described example embodiments.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS/EXAMPLE EMBODIMENTS

Figure 1:
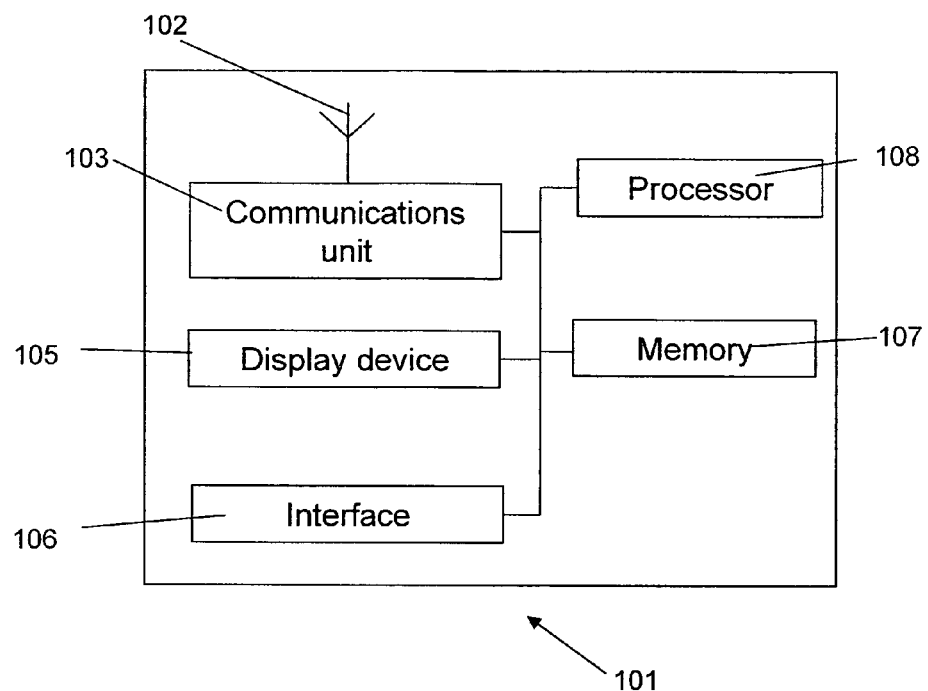
FIG. 1 illustrates an example embodiment of the first/second apparatus comprising a number of electronic components, including memory, a processor and a communication unit.

Other example embodiments depicted in the figures have been provided with reference numerals that correspond to similar features of earlier described example embodiments. For example, feature number 1 can also correspond to numbers (101), (201), (301) etc. These numbered features may appear in the figures but may not have been directly referred to within the description of these particular example embodiments. These have still been provided in the figures to aid understanding of the other example embodiments, particularly in relation to the features of other described example embodiments.

It is not uncommon for an individual, or a group of individuals to have access to multiple communication devices/apparatus. For example, an individual may have both a work phone and a business phone, or a husband and wife each may have a mobile phone. Each of these communication devices may, for example, be capable of registering on the same data network to allow communication with other communication devices/apparatus on the data network. Generally each of the communication devices is associated with an identity which allows the data intended for the identity to be directed to the corresponding device. For example, if a colleague calls the individual's work phone number (the identity associated with the work phone), only the work phone can receive the (phone call) data from the data network. That is, in this example, the user must have access to the work phone, and the work phone must be connected to the data network to receive the call.

However there may be situations where one or more of these communication device/apparatus may be unable to access the network. For example, a phone (or other communication device/apparatus) may be out of battery, turned off and/or out of range of a network transmitter.

Alternatively/in addition, the user may wish to transmit/receive data (e.g. calls) associated with an identity (e.g. telephone number) on a data network but he does not wish to use the apparatus (e.g. mobile phone) normally associated with that identity (e.g. telephone number). For example, he may not wish to carry his business phone with him to a personal engagement, as he is taking his personal phone, but he is awaiting an urgent business call. In situations such as these, it may be beneficial to have a flexible association between the available apparatus (e.g. communication devices) and corresponding identities.

FIG. 1 depicts an example embodiment (101) of a first/second apparatus according to the present disclosure, such as a mobile phone or personal digital assistant (or other communication device), comprising a screen (105) such as, for example, a touch screen or LCD display. In other example embodiments, the apparatus (101) may comprise a module for a mobile phone (or PDA or audio/video player), and may just comprise a suitably configured memory (107) and processor (108) (see below).

The first/second apparatus (101) of FIG. 1 is configured such that it may receive, include, and/or otherwise access data. For example, this example embodiment (101) comprises a communications unit (103), such as a receiver, transmitter, and/or transceiver, in communication with an antenna (102) for connecting to one or more wireless networks (e.g. Bluetooth network, mobile phone network) and/or a port (not shown) for accepting a physical connection to a network, such that data may be received via one or more types of wired and/or wireless networks. This example embodiment comprises a memory (107) that stores data, possibly after being received via an antenna (102) or port or after being generated at the user interface (106). The user interface allows the user to generate input data (e.g. by pressing keys/buttons or interacting with a touch screen). The processor (108) may receive the data from the user interface (106), from the memory (107), and/or from the communication unit (103). Regardless of the origin of the data, these data may be outputted to a user of apparatus (101) via a display device (105), and/or any other output devices provided with the apparatus. The processor (108) may also store the data for later use in the memory (107). The memory (107) may store computer program code and/or applications which may be used to instruct/enable the processor (108) to perform functions (e.g. generate, delete, read, write and/or otherwise process data). It will be appreciated that other example embodiments may comprise additional displays (e.g. CRT, LED screen and/or plasma screen) and/or user interfaces (e.g. physical keys and/or buttons). It will be appreciated that references to a memory or a processor may encompass a, plurality of memories or processors.

Figure 2:
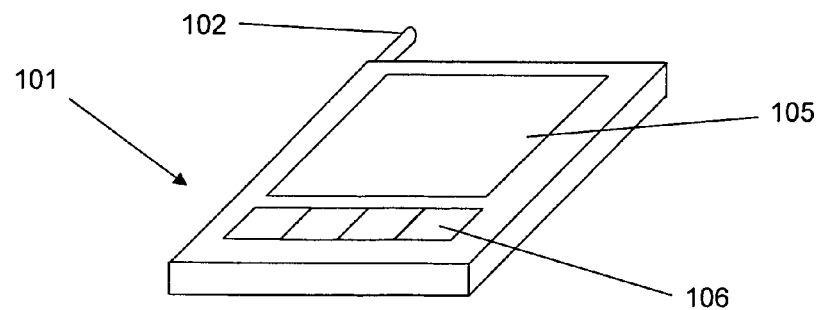
FIG. 2 depicts an example embodiment with a touch screen and physical buttons.

FIG. 2 depicts the outward appearance of an example embodiment of FIG. 1 comprising a portable electronic device (101), e.g. such as a mobile phone, with a user interface comprising a screen (105), a physical keypad (106) comprising buttons, a memory (not shown) and a processor (not shown).

Figure 3A:
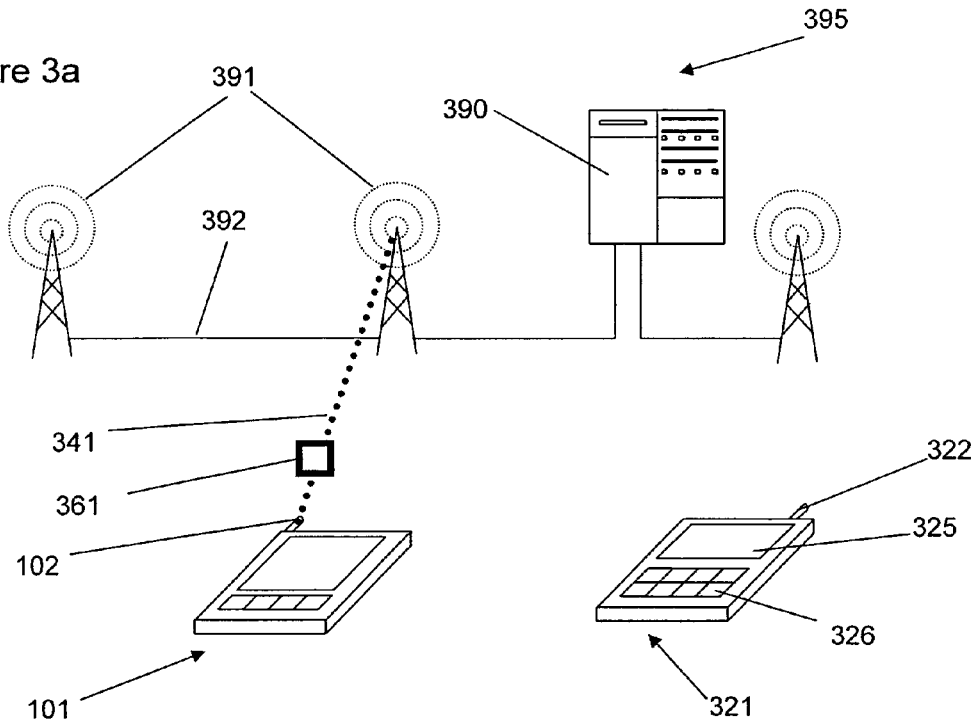
FIG. 3a depicts an embodiment of the first apparatus connected to a network and an embodiment of the second apparatus.

FIG. 3a depicts a first apparatus (101) (which is the example embodiment depicted in FIG. 1) connected with a network (395). The network (395) in this case comprises a network server (390), transceiver antennas (391) and wires (392) connecting the antennas (391) to the data network server (390). The first-identity-first-apparatus connection (341) between the first apparatus and the network antenna (390) is, in this case, a radio frequency wireless connection.

The first apparatus (101) has a first identity (e.g. a telephone number, a hardware SIM or software SIM) associated therewith the first apparatus. The first apparatus (101) is connected to the data network (395) via a first-identity-first-apparatus connection (341). This first-identity-first-apparatus connection (341) enables the first apparatus to send data via the network, the data being denoted as being from the first identity (361) (e.g. phone calls from the first identity and/or phone calls to the first identity). In this case, the transmitted data comprises denotation data indicating that it is sent from the first identity. This first-identity-first-apparatus connection (341), in this case, also enables the first apparatus to receive data via the network, the data being denoted as being to the first identity (361) (e.g. phone calls from a third party to the first identity). In this case, the transmitted data comprises denotation data indicating that it is sent to the first identity.

For example, in this case, (phone calls or message) data transmitted (e.g. by a third party) via the data network (395) to the first identity (e.g. represented by a phone number), the data would be received by first apparatus using the first-identity-first-apparatus connection (341). It will be appreciated that, for other embodiments, the denotation data may be used only by the network and not transmitted to the recipient. It will be appreciated that, for other embodiments, the transmitted data may be associated with the originator and/or recipient identity. The first apparatus may be associated with a first label (e.g. an IMEI).

In this case, the first apparatus is configured to generate data denoted as being from the first identity and transmit the generated data via the network (395) to another communication device (not shown) on the data network (395). It will be appreciated that the first apparatus may be a business phone or a personal phone of an individual.

FIG. 3a also depicts a second apparatus (321), which has corresponding features to the embodiment of FIG. 1. The second apparatus (321) depicted in FIG. 3, such as a mobile phone or personal digital assistant (or other communication device), comprises a screen (324), a keypad (326), at least one memory (not shown), at least one processor suitable for storing computer program code (and/or other data)(not shown), and an antenna (322) enabling the second apparatus to form a connection with the data network (395), and an communication channel antenna configured to receive Bluetooth signalling. In other example embodiments, the second apparatus (321) may comprise a module for a mobile phone (or PDA or audio/video player), and may just comprise a suitably configured memory and processor.

In this case, both the first apparatus and the second apparatus have been provided with corresponding encryption keys. It will be appreciated that other embodiments may not use/require encryption (e.g. closed networks).

It will be appreciated that one or more other third party apparatus (not shown) can connect to the data network (395) in order to transmit data to/receive data from the first identity.

It will be appreciated that the second apparatus may be, for example, a business phone or a personal phone of an individual, or a phone of a family member. It will be appreciated that the second apparatus may be connected to the data network (395) via a second-identity-second-apparatus connection (not shown). The second-identity-second-apparatus connection enables the second apparatus to transmit data denoted as being from the second identity and/or receive data denoted as being to the second identity via the data network.

In this case the first apparatus (101) is configured to initiate transmission of the proxy initiation command to the second device on the basis of a determined parameter associated with the first apparatus (101) and/or second apparatus (321). In this case, the determined parameter is the energy available to the first apparatus (e.g. remaining battery life). That is, the first apparatus determines the energy available to it as a function of time. If the first apparatus (101) detects that the amount of energy is below a threshold (e.g. such that it could not support a one minute phone call), the first apparatus is configured to transmit a proxy initiation command to the second apparatus and shut down. In this case the first apparatus encrypts the proxy initiation command using the encryption key. The proxy initiation command may be transmitted automatically or based on user confirmation. It will be appreciated that the proxy initiation command may not enable the second device to be associated with the first label.

It will be appreciated that other parameters (e.g. network availability, geographical location, energy usage and/or power consumption) may affect the ability of the first apparatus to maintain the first-identity-first-apparatus connection and any combination of these parameters may be used by the first apparatus to determine when to send the proxy initiation command.

It will be appreciated that alternatively/in addition the transmission of the proxy initiation command may be initiated manually and/or pre-programmed by the user, or initiated when some other criteria is satisfied. For example, the proxy initiation command may be transmitted at a certain time (e.g. 5 pm each day) or when the apparatus is taken out of the user's place of work.

Figure 3B:
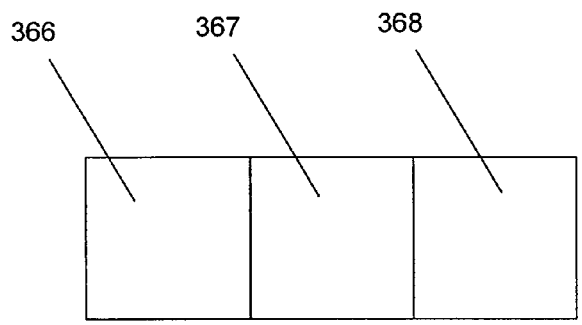
FIG. 3b depicts the data structure of a proxy initiation command.

FIG. 3b depicts the data structure of the proxy initiation command. In this case, the proxy initiation command comprises identity data representing the first identity (367), the data being in the form of a software subscriber identity module (SIM). In this case, the proxy initiation command comprises an activation command (366) which enables the second apparatus to use the identity data representing the first identity to initiate a connection. The proxy initiation command, in this case, also comprises capability data (368), which restricts how the first identity may be used by the second apparatus (e.g. it may give a time limit on how long the first-identity-second-apparatus may be active, or restrict the services available).

It will be appreciated that for other embodiments the proxy initiation command may not comprise capability data (e.g. where there are no restrictions on the first-identity-second-apparatus connection). It will be appreciated that for other embodiments the proxy initiation command may not comprise identity data representing the first identity. For example the identity data representing the first identity may be previously stored on the second device. It will be appreciated that the activation command may comprise a key (e.g. encryption key) which enables the second apparatus to unlock data (e.g. encrypted data) representing the first identity, thereby enabling the second apparatus to initiate a first-identity-second-apparatus connection. It will be appreciated that for other embodiments the proxy initiation command may comprise recipient data denoting the intended recipient (e.g. where the proxy initiation command is transmitted to an identity via the data network).

Figure 3C:
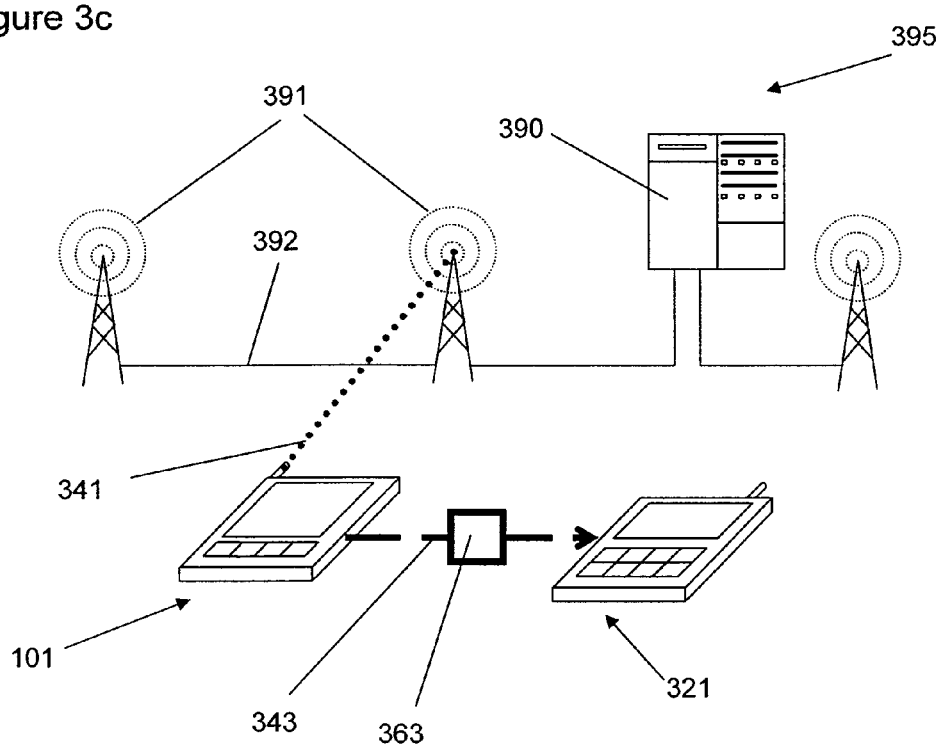
FIG. 3c shows the embodiment of the first apparatus transmitting a proxy initiation command to the embodiment of the second apparatus.

FIG. 3c depicts the first apparatus (101) of FIG. 1 transmitting a proxy initiation command (363) to the second apparatus (321), the transmission, in this case, being initiated based on the first apparatus (101) running out of battery. In this case the proxy initiation command (363) is transmitted via a local network command channel (343) (e.g. Bluetooth™). It will be appreciated that in other example embodiments, the proxy initiation command may be sent via the data network (395) (e.g. via SMS message) or some other suitable command channel (e.g. infrared network channel, radio-frequency channel). In this case the proxy initiation command includes identity data representing the first identity, the data being in the form of a software subscriber identity module (SIM).

It will be appreciated that in other example embodiments the identity data representing the first identity may be previously wholly or partially stored on the second apparatus. It will be appreciated that the first identity may be stored in a hardware SIM on the first apparatus and as a corresponding software SIM on the second apparatus.

The proxy initiation command (363) is configured to enable the second apparatus (321) to initiate a first-identity-second-apparatus connection (e.g. after unencrypting the proxy initiation command using the encryption key). The first-identity-second-apparatus connection allows the second apparatus to transmit and/or receive data associated with the first identity via the data network (395). That is, the second apparatus (321) may be considered to be masquerading as the first apparatus (101), in that calls and/or messages (and/or other data) associated with the first identity (e.g. associated with the telephone number 'of' the first apparatus) are directed to the second apparatus (321) rather than the first apparatus (101).

It will be appreciated that the second apparatus (321) may also be associated with a second (default) identity. The second apparatus may be configured to enable a second-identity-second-apparatus connection with the data network (395), the second-identity-second-apparatus connection enabling data associated with the second identity to be received/transmitted by the second apparatus via the data network (395). Therefore, for example, a friend's phone call directed to the second apparatus' user's personal number (associated with the second identity) would be received by the second apparatus (e.g. a user's personal phone) using the second-identity-second-apparatus connection. In such a case, the second apparatus (321) has both the first and second identities for use in making a connection. In other embodiments, the second apparatus may switch to only the use of the first identity after receipt of the proxy initiation command.

In this case, the second apparatus is pre-elected by the user of the first apparatus as the recipient of the proxy initiation command (363) (using a Bluetooth™ network control channel (343)). Alternatively/in addition, the second apparatus could be elected on the basis of proximity (e.g. the network and/or first apparatus could maintain or determine a list of apparatus within a certain distance of the first apparatus (e.g. within 50 meters)), or of a group membership (e.g. Instant Community such as Nokia Instant Community, Facebook® friends, phone book contacts, email contacts) and/or an identity associated with the second apparatus (e.g. by electing the phone of a family member/business partner). That is, the first apparatus may determine which apparatus will be the second apparatus.

Figure 3D:
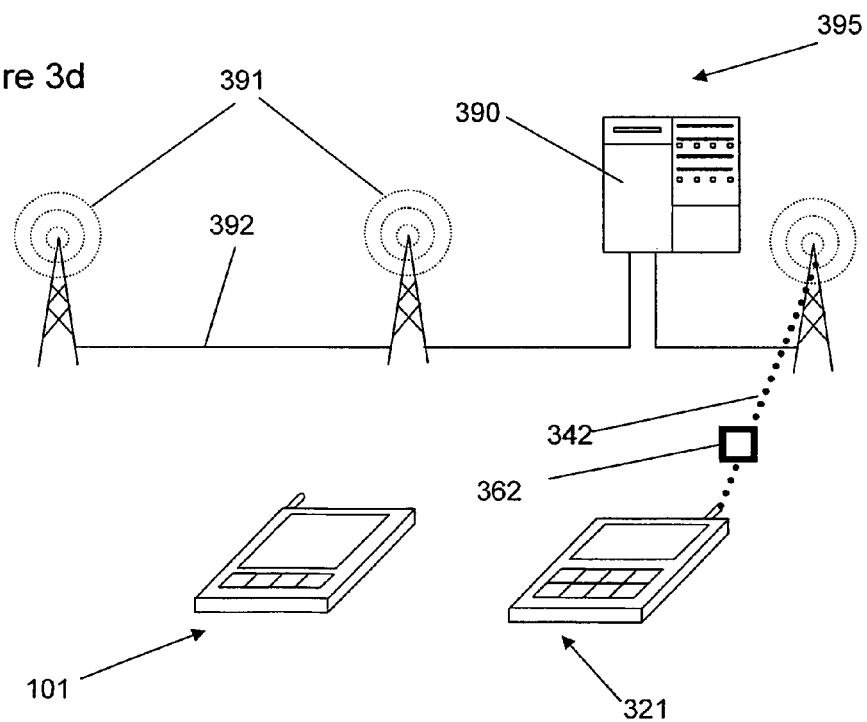
FIG. 3d depicts the embodiment of the first apparatus and an embodiment of the second apparatus connected to a network.

FIG. 3d depicts the connections when the proxy initiation command has been transmitted. In this case, when the proxy command has been transmitted, the first apparatus is configured to automatically disable the use of the first-identity-first-apparatus connection. This may be performed by the first apparatus turning off (e.g. running out of battery); entering a sleep mode or terminating the first-identity-first-apparatus connection. Other example embodiments may be configured to enable manual shut down. It will be appreciated that other embodiments may wait until confirmation is received, from the second apparatus, of the availability of the second apparatus and/or of receipt of the proxy initiation command before termination of use of the first-identity-first-apparatus connection.

Using the identity data contained in the proxy initiation command, the second apparatus registers on the data network (395) (e.g. on a network server) using the first identity thereby initiating a first-identity-second-apparatus connection (342) with the data network (395). Therefore, for example, prior to transmission of the proxy initiation command a colleague's (phone call) data directed to the (user's work number) first identity would be received by the first apparatus (101) (e.g. a user's business phone) using the first-identity-first-apparatus connection. However, after the transmission of the proxy initiation command and the initiation of the first-identity-second-apparatus connection, the colleague's (phone call) data directed to the (user's work number) first identity would be received by the second apparatus (321) (e.g. a user's personal phone) using the first-identity-second-apparatus connection (342).

Figure 3E:
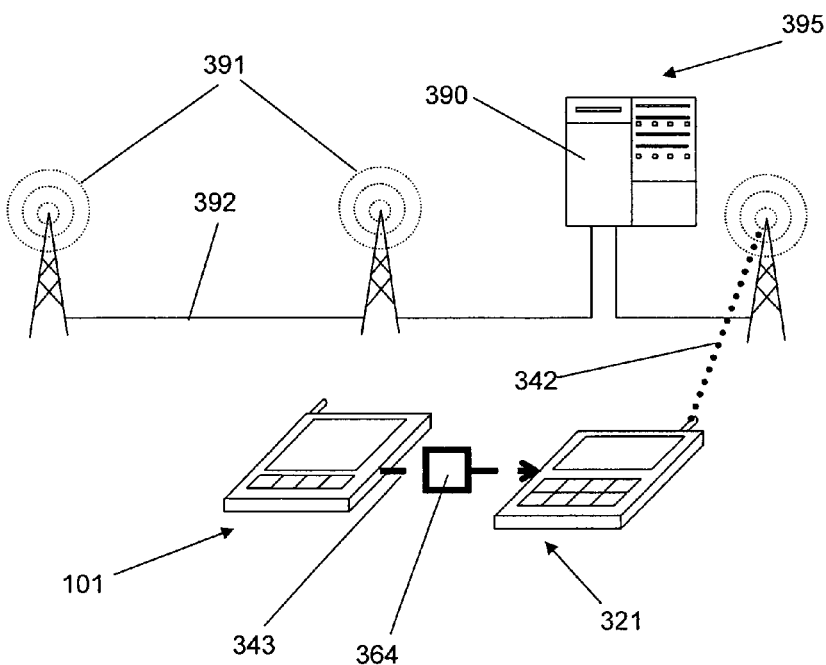
FIG. 3e depicts the embodiment of the first apparatus transmitting a proxy termination command to the embodiment of the second apparatus.

FIG. 3e depicts the first apparatus (101) and second apparatus when the first apparatus (101) has been recharged. In this case, the first apparatus (101) is configured to reinitiate the first-identity-first-apparatus connection. It will be appreciated that other example embodiments may be configured to reinitiate the first-identity-first-apparatus connection based on different criteria (e.g. at a certain time or in response to a user command).

In this case, the network (395) is configured to support only one connection associated with the first identity (it will be appreciated that other networks may support multiple connections associated with the same identity). Therefore, in order that the one connection associated with the first identity is associated with the first apparatus (rather than with the second apparatus), the first apparatus transmits a proxy termination command to the second apparatus. In this case the proxy termination command (364) is sent via the Bluetooth™ connection (343). It will be appreciated that in other example embodiments the proxy termination command may be sent via the data network (395) (e.g. to a second identity associated with a second apparatus) or via another command channel (e.g. using a radio frequency network). Based on the proxy termination command the second apparatus (321) is enabled to terminate the first-identity-second-apparatus connection (342). The situation will then return, to the original arrangement as depicted in FIG. 3a.

It will be appreciated that in other example embodiments, the second apparatus may send a message to the first apparatus confirming that the first-identity-second-apparatus connection (342) has been terminated. Alternatively/in addition the first apparatus may be configured to monitor for the termination (and/or unavailability) of the first-identity-second-apparatus connection (e.g. via a connection to the data network (395) using a third identity, or repeatedly trying to register on the network (395) using the first identity (e.g. where the network (395) is configured to reject repeat registrations associated with the same identity)).

In this example embodiment, the first device is configured to automatically register the first-identity-first-apparatus connection (341) when the proxy termination (364) has been transmitted (e.g. after a certain time has elapsed (e.g. between 0 and 300 seconds)).

Alternatively/in addition the second device may be configured to disable the first-identity-second-apparatus connection independently of the first apparatus. For example, the second device may be configured to disable the first-identity-second-apparatus connection after a certain period has elapsed since the proxy initiation command was received (e.g. a period of between 30 minutes and 24 hours). It will be appreciated that the first apparatus may check whether the first-identity-second-apparatus connection (342) is still active before activating the first-identity-first-apparatus connection (341).

It will be appreciated that other networks may be configured to support multiple connections from different apparatus, each of the multiple connections associated with the same identity.

It will be appreciated that the first-identity-first-apparatus connection (341) may have the same or different capabilities than the first-identity-second-apparatus connection (342) (e.g. a restricted SIM). For example, the first-identity-first-apparatus connection (341) may enable information associated with the first identity to be sent and received by the first apparatus (e.g. enabling calls to be made and received and text messages to be sent and received), whereas the first-identity-second-apparatus connection may be configured only to receive data associated with the first identity (i.e. calls associated with the first identity could be received but not made).

It will be appreciated that other example embodiments may support a plurality of simultaneous identity transfers between apparatus. For example, a second apparatus associated with a second identity (i.e. enabling a second-identity-second-apparatus connection) and a first apparatus associated with a first identity (i.e. enabling a first-identity-second-apparatus connection) may be configured to swap identities by mutually sending proxy initiation commands to each other. The result, in this case, would be that the first apparatus would be enabled to establish a second-identity-first-apparatus connection with the data network (395) and the second apparatus would be enabled to establish a first-identity-second-apparatus connection with the data network (395).

It will be appreciated that if the second apparatus is no longer able to support the first-identity-second-apparatus connection (e.g. it too runs out of battery), the second device may check, if and when it is again able to support the first-identity-second-apparatus connection, whether another apparatus has registered a connection using the first identity (e.g. if the first apparatus has regained power and reinstituted the first-identity-first-apparatus connection). If another apparatus has registered a connection using the first identity, the second apparatus may not reinstate the first-identity-second-apparatus connection.

Advantages of these example embodiments may include that they may facilitate maintaining at least one connection with the network (395) associated with the first identity. In addition they may allow a user to use the identity associated with an apparatus more flexibly by decoupling the identity from the apparatus.

It will be appreciated that the proxy initiation command may allow the second apparatus (e.g. mobile phone) to masquerade as the first apparatus from the point of view of the network. For example, if a husband's phone (first apparatus) was running out of battery it may send a proxy initiation command to his wife's phone (second apparatus) which would prompt the wife's phone to assume the identity of the husband's phone (e.g. in addition to the identity of the wife's phone). In this case if someone sent a text to, called (or otherwise sent data to) the husband's phone number, the text or call would be directly received by the wife's phone.

Figure 4A:
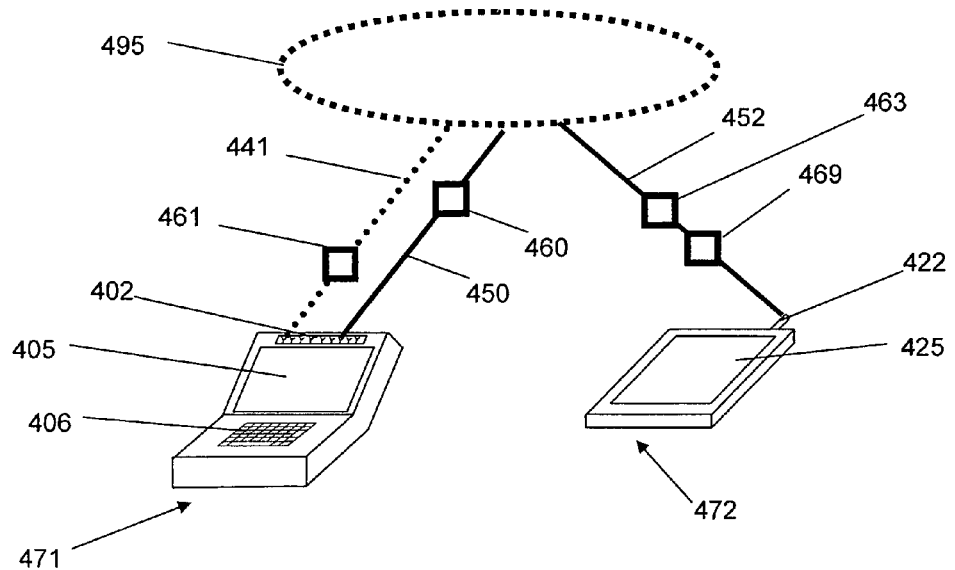
FIG. 4a illustrates depicts a further embodiment of the first apparatus connected to a data network using two identities and an embodiment of the second apparatus connected to the data network.

FIG. 4a depicts a second example embodiment of the first apparatus (471) (e.g. a personal digital assistant) and a second example embodiment of the second apparatus (472) (e.g. a mobile phone). In this case the first apparatus (471) is configured to enable a third-identity-first-apparatus connection (450) to the data network in addition to enabling the first-identity-first-apparatus connection (441) to the data network (unlike the previous first apparatus example embodiment which was configured to enable one (first-identity-first-apparatus) connection with the network). In this case the identity data representing the third identity is stored on a hardware SIM card and is permanently associated with the first apparatus. In this case the identity data representing the first identity is stored as a software. SIM and is temporarily associated with the first apparatus.

In this case the first identity is used for professional correspondence with the user of the first apparatus (e.g. it is the number for an on-call doctor, or an on-shift worker), whereas the third identity is used for personal correspondence. Thus, in the situation depicted in FIG. 4a, when someone uses, for example, a third party apparatus (not shown) to call (or transmit data to) the number associated with the third identity the (call) data (460) is directed to the first apparatus (471) (using the third-identity-first-apparatus connection (450)). Also, when someone calls (or transmits data to) the number associated with the first identity (e.g. a professional call), the (call) data (461) will also be directed to the first apparatus (471) via the first-identity-first-apparatus connection (441).

It will be appreciated that the phone and/or network (e.g. a network server) may be configured to prioritise the identities and/or connections. For example, the connections may be prioritised such that certain data (461) denoted as being to the first identity (e.g. professional calls, messages) are given priority over certain data (460) denoted as being to the third identity (e.g. personal calls). Priority may, for example, be implemented by providing an audio, visual and/or other alarm indicating that data relating to a higher priority identity is being received, or by cancelling the lower priority (call) data stream to allow the higher priority (call) data stream to be received. That is, the prioritising may, for example, enable the device to cancel an existing call, put an existing call on hold and/or alert the user when a call is received based on the priority of the received data. It will be appreciated that the server may maintain, for example, a Home Location Register (HLR).

The first apparatus (471), in this case, is configured to maintain the first-identity-first-apparatus connection (441) and the third-identity-first-apparatus connection (450) simultaneously by supporting two modem instances. It will be appreciated that more that two connections may be facilitated by having a plurality of corresponding modem instances. It will be appreciated that a plurality of identities may be supported by the same apparatus by alternating between a plurality of respective modem instances.

The second apparatus (472) in this case is also associated with a second identity, the second apparatus being configured to enable a second-identity-second-apparatus connection (452) with the data network (495). The second identity in this case is for the user of the second apparatus's personal use. The second apparatus is configured such that it can generate and transmit data denoted as being from the second identity (via the second-identity-second-apparatus connection (452) with the data network (495)) and receive data from the data network which is denoted as being for the second identity (via the second-identity-second-apparatus connection (452)).

Unlike the previous example first apparatus which initiated transmission of the proxy initiation command based on a determined (battery life) parameter, the first apparatus of FIG. 4 is configured to transmit the proxy initiation command to the second apparatus based on a predetermined rota (which may be stored on the first apparatus and/or on a network server and/or another apparatus which is in communication with the first apparatus/network). Unlike the previous example first apparatus which transmitted the proxy initiation command using an independent command channel, the first apparatus (471) of FIG. 4 is configured to transmit the proxy, initiation command using the data network (495). The proxy initiation command is transmitted using the second-identity-second-apparatus connection (452).

In this case, the proxy initiation command comprises denotation data indicating that the desired recipient is the second identity. In this case, the proxy initiation command also comprises an activation command.

It will be appreciated that other example embodiments may elect the second apparatus (472) using a Unique identifier (UID) (e.g. by the person logging in), GPS positioning, a MAC address of a Wifi router or the like. It will be appreciated that the proxy initiation command could be triggered externally by an authorized entity (i.e. an employer) or by calendar events.

Figure 4B:
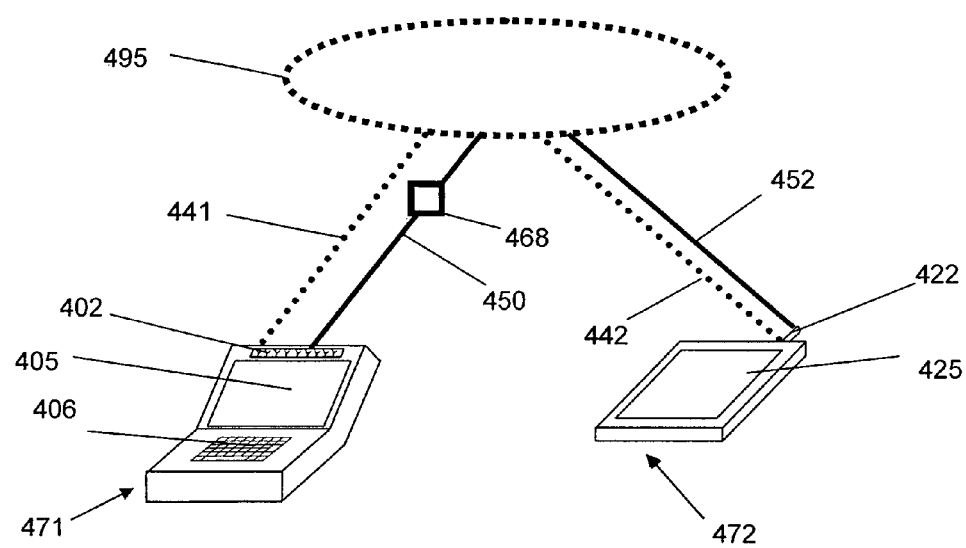
FIG. 4b shows illustrates depicts the further embodiment of the first apparatus connected to the data network using two identities and the embodiment of the second apparatus connected to the network using two identities.

In this case, the first device (471) maintains the first-identity-first-apparatus connection (441) (as depicted in FIG. 4b) after transmitting the proxy initiation command. In this case, the proxy initiation command (463) is an activation command and does not contain information representing the first identity. The identity data representing the first identity is stored locally in the memory of the second apparatus (472). When the second apparatus has received the proxy initiation command (463) via the second-identity-second-apparatus connection (442), it initiates the first-identity-second-apparatus connection (442) using the locally stored data.

In the arrangement depicted in FIG. 4b, there are two connections with the network associated with the first identity (the first-identity-first-apparatus connection (441) and the first-identity-second-apparatus connection (442)). In this case, the network is configured to maintain a hierarchy of connections such that where there is a plurality of connections associated with one identity, the network is configured to direct data (associated with the identity) to the apparatus associated with the identity on the basis of the position of the connection in the hierarchy. For example, the first-identity-first-apparatus connection (441) may be higher in the hierarchy than the first-identity-second-apparatus connection (442). Therefore, in this case, if data associated with the first identity were transmitted via the network, it would be directed to the first apparatus (471). It will be appreciated that other networks may enable a copy of data, denoted as being to an identity, to be sent multiple apparatus associated with that identity.

Figure 4C:
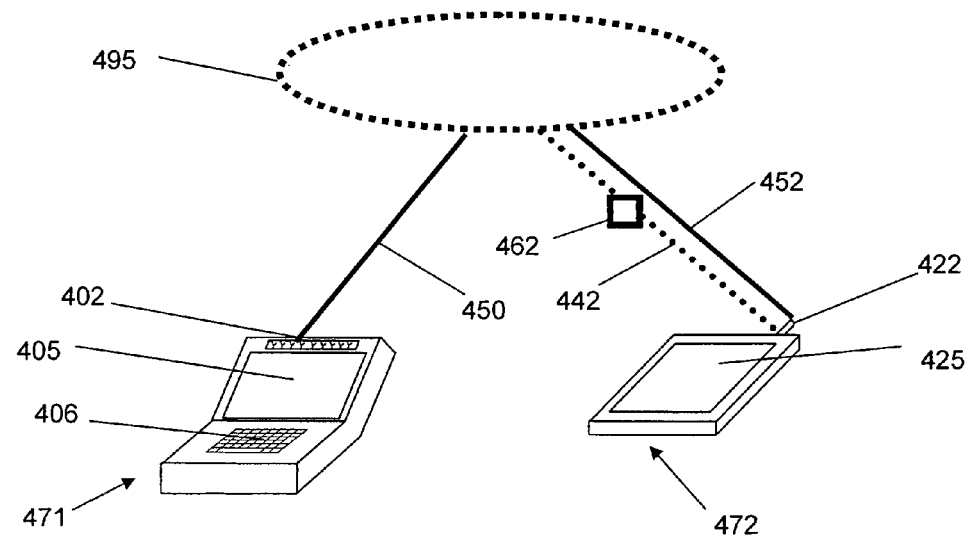
FIG. 4c depicts illustrates depicts the further embodiment of the first apparatus connected to the data network and the embodiment of the second apparatus connected to the network using two identities.

When the second apparatus (472) has established the first-identity-second-apparatus connection (442) it is configured to send a confirmation command (468) to the third identity on the first apparatus via, the third-identity-first-apparatus connection (450). When this confirmation command is received by the first apparatus, the first apparatus is configured to terminate the first-identity-first-apparatus connection (441), as depicted in FIG. 4c. In this way a first identity (e.g. telephone number) can be transferred from the first apparatus (471) to a second apparatus (472). Unlike the previous example embodiments of FIG. 3, where each identity had a corresponding default apparatus, in the example embodiments of FIG. 4, the first identity may be considered a roaming identity which can be passed from apparatus to apparatus without having a default apparatus with which it is normally associated.

Advantages of these embodiments may include that a single identity (or telephone number) can be passed around one or more apparatus. This may allow a group of people (e.g. a business, a group of doctors) to provide a single identity (e.g. a telephone number) to third parties such that the third party can use the single identity to contact one of the members of the group. This may be useful where it is more important to enable contact with one member of the group than to enable contact with a specific member of the group. It may also allow call forwarding without needing the intended apparatus to be available to the network and/or to be governed by the network (i.e. the user may have more control in choosing who to forward calls to).

Figure 5:
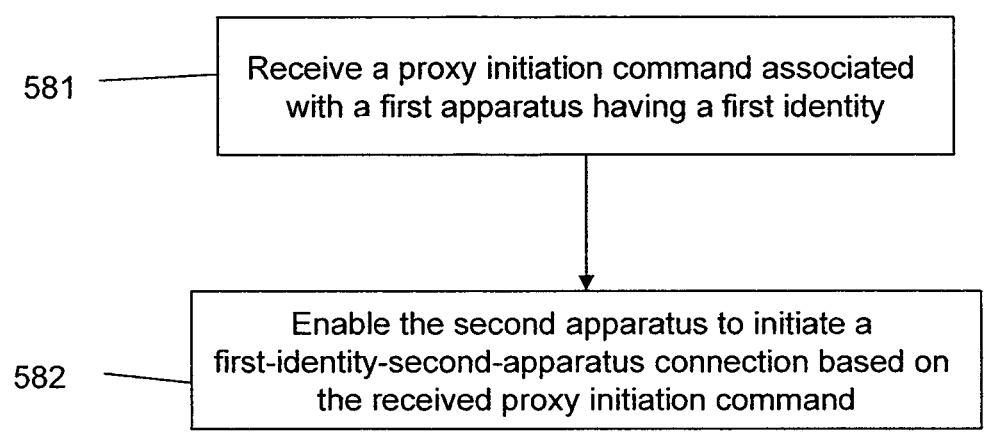
FIG. 5 shows a flow diagram illustrating how the receipt of the proxy initiation command enables the initiation of a first-identity-second-apparatus connection.

FIG. 5 shows a flow diagram illustrating how the receipt of the proxy initiation command enables the initiation of a first-identity-second-apparatus connection.

Figure 6:
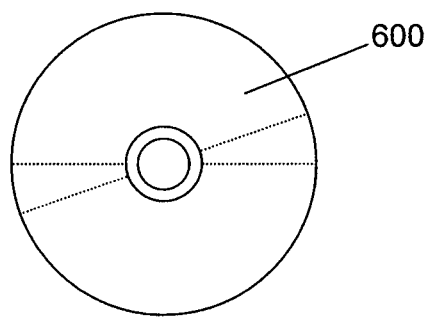
FIG. 6 illustrates schematically a computer readable media providing a program according to an example embodiment of the present invention.

FIG. 6 illustrates schematically a computer/processor readable media 600 providing a program according to an example embodiment of the present invention. In this example, the computer/processor readable media is a disc such as a digital versatile disc (DVD) or a compact disc (CD). In other example embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some example embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such example embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some example embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/ example embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to example embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or example embodiment of the invention may be incorporated in any other disclosed or described or suggested form or example embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. A first apparatus having a first identity associated with the first apparatus and a second identity associated with the first apparatus, wherein the first identity and the second identity are a professional identity and a personal identity, respectively, the first apparatus comprising:
   at least one processor; and
   at least one memory including computer program code,
   the at least one memory and the computer program code configured to, with the at least one processor, cause the first apparatus to perform at least the following:
   enable initiation of a first-identity-first apparatus connection to a data network, the first-identity-first apparatus connection enabling the first apparatus to transmit data denoted as being from the first identity and/or receive data denoted as being to the first identity via the data network;
   enable initiation of a second-identity-first-apparatus connection to the data network, the second-identity-first-apparatus connection enabling the first apparatus to transmit data denoted as being from the second identity and/or receive data denoted as being to the second identity via the data network; and
   enable transmission of a proxy initiation command to a second apparatus, wherein the proxy initiation command is configured to enable the second apparatus to initiate a first-identity-second-apparatus connection, the first-identity-second-apparatus connection enabling the second apparatus to transmit data denoted as being from the first identity and/or receive data denoted as being to the first identity via the data network.

2. The first apparatus of claim 1, wherein the first apparatus is configured to:
   determine at least one parameter associated with the first apparatus and/or second apparatus; and
   on the basis of the determination, perform at least one of:
   initiate transmission of the proxy initiation command from the first apparatus to the second apparatus;
   initiate transmission of a proxy termination command from the first apparatus to the second apparatus, the proxy termination command being configured to enable the second apparatus to terminate the first-identity-second-apparatus connection;
   disable the first-identity-first-apparatus connection.

3. The first apparatus of claim 2, wherein the at least one parameter comprises one or more of:
   geographical location of the first apparatus;
   power consumption of the first apparatus;
   availability of the second apparatus;
   energy available to the first apparatus;
   rate of change of energy available to the first apparatus;
   power available to the first apparatus;
   rate of change of power available to the first apparatus;
   quality of first-identity-first-apparatus connection; and
   rate of change of quality of the first-identity-first-apparatus connection.

4. A second apparatus comprising:
   at least one processor; and
   at least one memory including computer program code,
   the at least one memory and the computer program code configured to, with the at least one processor, cause the apparatus to perform at least the following:
   receive a proxy initiation command associated with a first apparatus, the first apparatus having a first identity and a second identity,
   wherein the first identity and the second identity are a professional identity and a personal identity, respectively; and
   enable the second apparatus to initiate a first-identity-second-apparatus connection based on the received proxy initiation command, the first-identity-second-apparatus connection enabling the second apparatus to transmit data denoted as being from the first identity and/or receive data denoted as being to the first identity via the data network.

5. The first apparatus of claim 1 or second apparatus of claim 4, wherein the first apparatus and/or second apparatus are configured to:
   enable the said connections to be registered on a network hierarchy, the network being configured to determine which connection and/or connections to use for transmitting data on the basis of each said connection's rank in the network hierarchy.

6. The first apparatus of claim 1, wherein the first apparatus is configured to:
   disable the first-identity-first-apparatus connection when the proxy initiation command is transmitted.

7. The first apparatus of claim 1 or the second apparatus of claim 4, wherein the proxy initiation command comprises an activation command and not first identity data, the first identity data representing the first identity.

8. The first apparatus of claim 1 or the second apparatus of claim 4, wherein the proxy initiation command is transmitted via a second connection and at least one of the said connections is enabled using a hardware SIM or a software SIM.

9. The first apparatus of claim 1, wherein the first apparatus is configured to:
   create a set of rules describing the capability of the first-identity-second-apparatus connection; and
   transmit the set of rules to the network and/or the second apparatus, thereby enabling the network and/or the second apparatus to apply the set of rules when using the first-identity-second-apparatus connection.

10. The apparatus of claim 1, wherein the first apparatus is configured to receive confirmation that the first-identity-second-apparatus connection has been established and, in response thereto, terminate the first-identity-first-apparatus-connection.

11. The first apparatus of claim 1 or second apparatus of claim 4, wherein
the first-identity-first-apparatus connection is enabled by registering, on the network, an association of the first identity with the first apparatus; and/or
the second-identity-first-apparatus connection is enabled by registering, on the network, an association of the second identity with the first apparatus; and/or
the first-identity-second-apparatus connection is enabled by registering, on the network, an association of the first identity with the second apparatus.

12. The second apparatus of claim 4, wherein the second apparatus is configured to:
activate a previously stored first identity based on the received proxy initiation command.

13. The second apparatus of claim 4, the second apparatus having a second identity associated with the second apparatus, wherein
the second apparatus is enabled to initiate a second-identity-second-apparatus connection, the second-identity-second-apparatus connection enabling the second apparatus to transmit data denoted as being from the second identity and/or receive data denoted as being to the second identity via the data network.

14. The apparatus of claim 4, wherein the second apparatus is configured to send a confirmation command to the first apparatus via the second-identity-first-apparatus connection, the confirmation command confirming that the second apparatus has established the first-identity-second apparatus connection.

15. A method, the method comprising:
enabling a first apparatus, which has both a first identity and a second identity associated therewith, wherein the first identity and the second identity are a professional identity and a personal identity, respectively, to initiate a first-identity-first apparatus connection to a data network, the first-identity-first apparatus connection enabling the first apparatus to transmit data denoted as being from the first identity and/or receive data denoted as being to the first identity via the data network;
enabling the first apparatus to initiate a second-identity-first-apparatus connection to the data network, the second-identity-first-apparatus connection enabling the first apparatus to transmit data denoted as being from the second identity and/or receive data denoted as being to the second identity via the data network; and
enabling transmission of a proxy initiation command from the first apparatus to a second apparatus, wherein the proxy initiation command is configured to enable the second apparatus to initiate a first-identity-second-apparatus connection, the first-identity-second-apparatus connection enabling the second apparatus to transmit data denoted as being from the first identity and/or receive data denoted as being to the first identity via the data network.

16. A computer program product comprising a non-transitory computer readable storage medium in which computer program code is stored, the computer program code causing an apparatus to perform the actions of claim 15 when executed by a processor.

17. A method, the method comprising:
receiving a proxy initiation command associated with a first apparatus, the first apparatus having both a first identity and a second identity associated with the first apparatus,
wherein the first identity and the second identity are a professional identity and a personal identity, respectively; and;
enabling the second apparatus to initiate a first-identity-second-apparatus connection based on the received proxy initiation command, the first-identity-second-apparatus connection enabling the second apparatus to transmit data denoted as being from the first identity and/or receive data denoted as being to the first identity via the data network.

18. A computer program product comprising a non-transitory computer readable storage medium in which computer program code is stored, the computer program code causing an apparatus to perform the actions of claim 17 when executed by a processor.

* * * * *